United States Patent [19] — [11] 3,895,363
Braginski et al. — [45] July 15, 1975

[54] MAGNETIC DOMAIN COUNTER

[75] Inventors: Aleksander I. Braginski, Pittsburgh; Paul G. Kennedy, Monroeville, both of Pa.

[73] Assignee: Westinghouse Electric Corporation, Pittsburgh, Pa.

[22] Filed: Jan. 18, 1974

[21] Appl. No.: 434,757

[52] U.S. Cl. ....... 340/174 TF; 340/174 SR; 324/142
[51] Int. Cl. ....................... G11c 11/14; G11c 19/00
[58] Field of Search ................. 340/174 TF, 174 SR

[56] References Cited

UNITED STATES PATENTS

| | | | |
|---|---|---|---|
| 3,701,132 | 10/1972 | Bonyhard et al. | 340/174 TF |
| 3,706,081 | 12/1972 | Bobeck et al. | 340/174 TF |
| 3,792,450 | 2/1974 | Bogar et al. | 340/174 TF |
| 3,812,480 | 5/1974 | Kish et al. | 340/174 TF |
| 3,825,910 | 7/1974 | Carr, Jr. et al. | 340/174 TF |

*Primary Examiner*—Stanley M. Urynowicz
*Attorney, Agent, or Firm*—R. W. Smith

[57] ABSTRACT

A magnetic domain bubble counter includes closed-end counting loops formed by domain propagating patterns having different numbers of pattern cells. Each cycle of rotation of a magnetic drive field is counted by advancing the magnetic domains to an adjacent cell position in each loop. Each encoded count of the counter is established, by the different domain positions within the loops. The maximum count of the counter is equal to the product of the sums of the pattern cells included in all of the loops. In one preferred form, the counted drive field rotations are produced by a rotatable meter movement to accumulate counts representing the consumption of a quantity to be measured.

9 Claims, 6 Drawing Figures

MAGNETIC DOMAIN COUNTER

BACKGROUND OF THE INVENTION

This invention relates to magnetic domain bubble propagation devices for counting phase rotations of a drive field and more particularly to a magnetic domain counter including closed-end counting loops having different numbers of propagating pattern cells in which domains are advanced simultaneously in each loop.

Magnetic domain propagation devices are known for use in data memory storage and logic circuit applications including shift registers and counters for use in combination with a domain storage system or for use in other circuit systems. In one general design for a magnetic domain counter, a propagating pattern is included on a wafer of magnetic domain material and has a series propagating path that includes as many pattern cells as in the counting capacity of the counter. A rotating drive magnetic field advances domain along the propagating pattern to increase the count. In such devices, having large counting capacities, a large number of pattern cells are required in an intricate pattern layout. The read cycle in these counters require substantial time for the counter readout to occur. When several readout sensors are used to decrease the read cycle times, a pattern layout and associated circuit operations become further complicated and difficult to provide.

Accordingly, it is desirable to provide a simpler and more efficient magnetic domain counter having substantially reduced propagating pattern configurations requiring fewer numbers of pattern cells. Further, it is desired to provide a magnetic domain counter having a readout circuit arrangement which is simpler, which may preserve the count after a read cycle, and which has faster readout cycle times. It is still further desirable to provide a magnetic domain counter which has different controllable counting, circuit configurations and which provide for nondestructive readout and nonvolatile storage of counts which may be accumulated at times when external power is not available. And still further, it is desirable to provide a domain drive magnetic field which is responsive to a rotatable meter movement responding to the flow of a quantity to be measured.

SUMMARY OF THE INVENTION

In accordance with the present invention, a magnetic domain bubble counter includes a domain propagation device having a wafer of magnetic domain material with an overlay of propagating patterns. The patterns include a group of closed-end counting loops. Each loop has a different predetermined number of pattern cells wherein each cell defines a count location. Each loop is provided with a magnetic bubble for counting propagation therein. The pattern connects the counting loops to a closed-end readout loop at bi-directional transfer gates. The readout loop includes a magnetic domain detector and a combined domain generator and eraser. A bias magnetic field, and readout and counted drive magnetic fields are applied to the wafer by external magnetic field sources.

A control circuit is connected to the magnetic domain propagation device and generates nucleating and erase pulse signals. Transfer pulse signals are also generated to activate the transfer gates so as to direct domains into and out of the different counting loops. When the gates are inactive, domains are propagated around the counting loops during counting cycles or along the readout loop to by-pass counting loop junctions during read cycles. An in-plane rotating drive field simultaneously advances magnetic domain bubbles in the counting loops. The domains advance from one pattern cell to the next with each revolution of the counted drive field. The domains are propagated to predetermined cell positions in each loop after a given number of counted drive field rotations. These magnetic domain positions correspond to an encoded count of the counter. The maximum count of the counter is equal to the product of the individual sums of pattern cells included in each of the counting loops.

The control circuit initiates a read cycle of the counter by applying an in-plane rotating readout drive magnetic field to the domain propagation device. Transfer pulses are applied to the transfer gates so that the bubble domain of each loop is propagated into the readout loop. The domains are propagated through the detector and each detected domain signal is applied to a decoder circuit. The readout loop has predetermined numbers of pattern cells so as to define corresponding binary readout bit frames having predetermined numbers of bit positions for each of the counting loops. Clocking reference signals from the control circuit are applied to the decoder circuit so as to indicate each complete cycle of phase rotation of the readout drive field. Accordingly, the decoder output correlates a detector output pulse with respect to one of the bit positions of each binary readout frame to provide a representation of a count number. The decoder output signal is applied to a desired utilization circuit.

The transfer gates permit the use of various combinations of the counting loops to provide different desired counts of the counter. In an alternative embodiment of a counting loop, a bi-directional transfer gate is connected within the loop to provide alternate loop paths and vary the number of pattern cells to be used within the counting loop. This permits further adjustment of the count or scale factor of the magnetic domain counter. The closed-end readout loop permits nondestructive read cycles wherein the magnetic domains are returned to the same positions within the counting loops following a readout from the counter.

A meter controlled drive field source in one embodiment of this invention includes a permanent magnet that is rotated about the propagation device by a rotatable meter movement. The meter movement is one of an integrating type responsive to the consumption of the flow of a quantity to be measured. A shaft supports the permanent magnet and includes a meter drive member formed by an impeller, in one embodiment, that is driven by a fluid flow such as water or natural gas at a residential dwelling. In another embodiment, the meter movement includes that of an induction watthour meter which includes a shaft supporting a electroconductive disk. The disk driven by current and voltage electromagnetic sections connected to conductors of electrical power to be measured. The shaft then rotates at a rate responsive to the flow or consumption of electrical power.

It is a general feature of this invention to provide a magnetic domain bubble counter having a simplified propagating pattern arrangement including a group of counting loops connected to a readout loop at transfer gates to provide magnetic domains in all or preselected combinations of the counting loops. It is another feature to provide a maximum count of a domain counter that is equal to the product of the sum of different numbers of pattern cells included in each of a group of counting loops having a circulating domain. It is a further feature of this invention to provide a closed-end readout loop to propagate domains from the counting loops in a readout format corresponding to the loop encoded positions and through a domain detector connected to a decoder. Further, a magnetic domain counter is provided which propagates domains to the same counted loop positions following a read cycle to produce a non-destructive readout and maintain counted positions if external power is lost to provide non-volatile storage in the counter. A still further feature of this invention is to provide a source of in-plane drive magnetic field for a magnetic domain counter by drive field sources generating magnetic fields in response to the rotation of a meter movement rotatable in response to the flow of a quantity to be measured.

Other features and advantages of this invention will be apparent from the detailed description of the drawing hereinbelow.

BRIEF DESCRIPTIONS OF THE DRAWINGS

DESCRIPTION OF THE PREFERRED EMBODIMENTS

Figure 1:
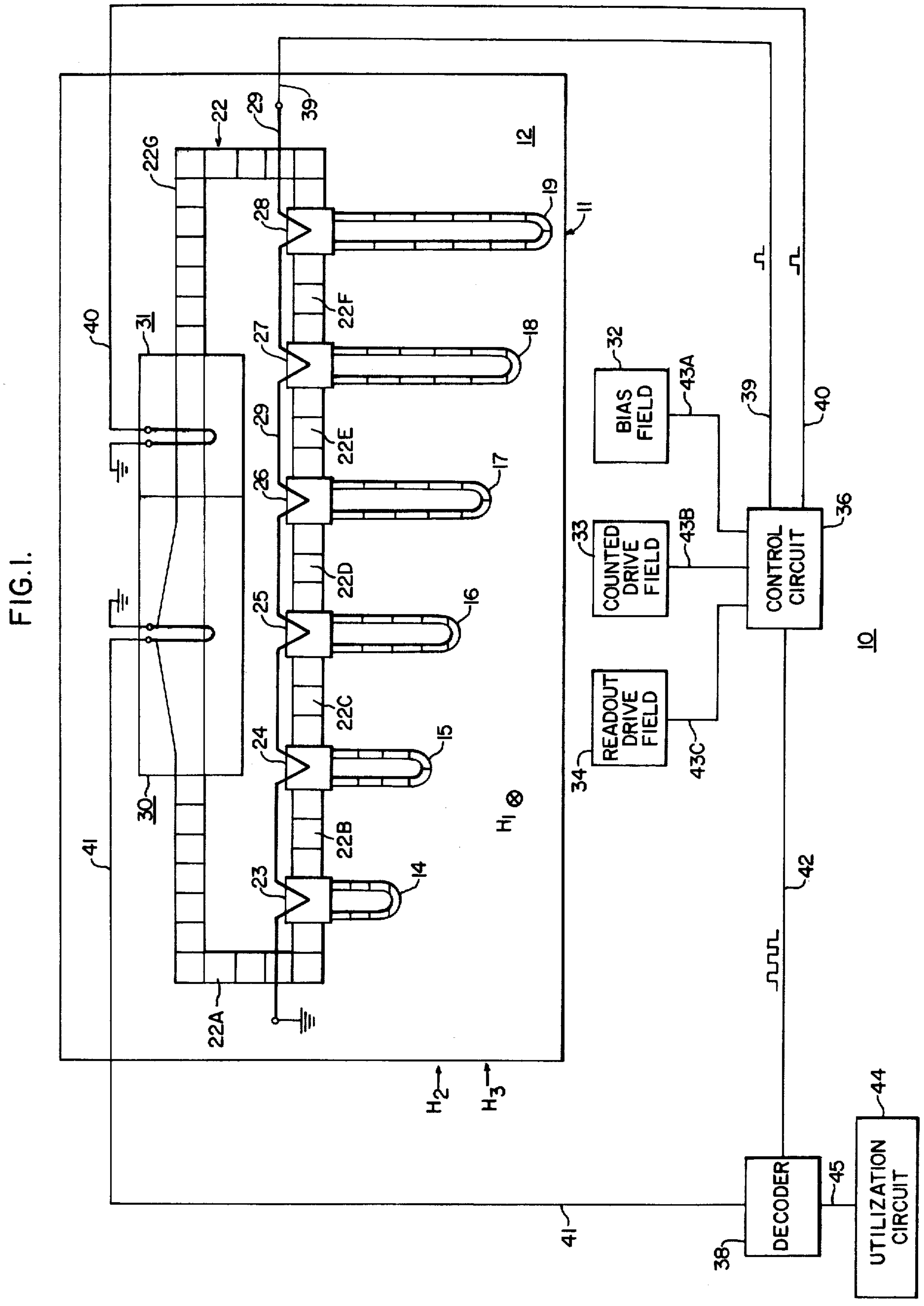
FIG. 1 is a schematic illustration of a magnetic domain bubble counter made in accordance with this invention.
Figure 2:
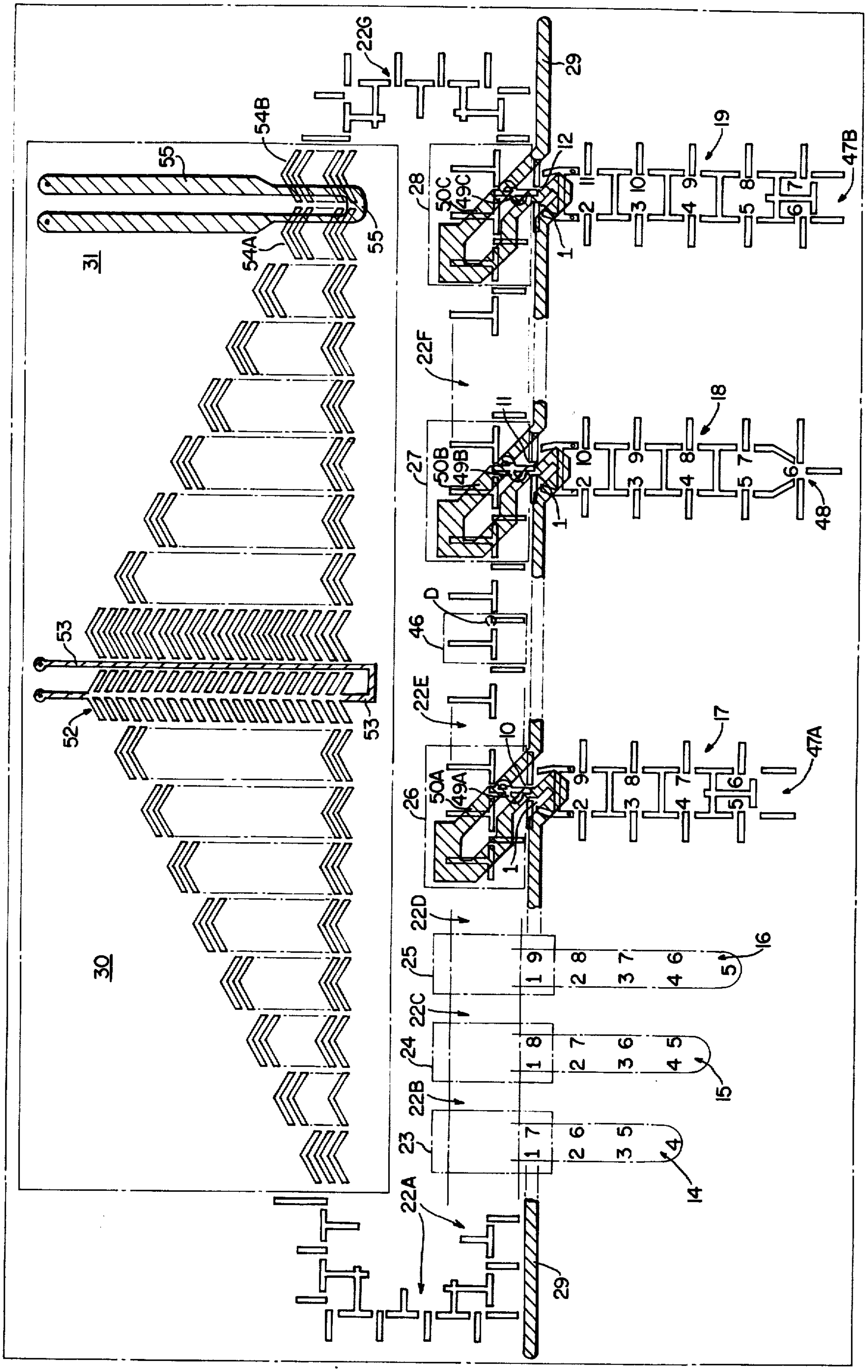
FIG. 2 is a pattern layout on a wafer of magnetic domain propagating material included in the magnetic domain counter shown in FIG. 1.

Referring now to the drawings and more particularly to FIG. 1 there is shown a magnetic domain bubble counter 10 including a magnetic domain propagation device 11. The device 11 includes a layer of magnetic domain propagating material formed by a wafer 12 of an epitaxial garnet film having known magnetic domain propagating characteristics. It is known that in presence of suitable magnetic bias fields normal to the plane of the wafer 12, the wafer material is capable of developing magnetic domains, typically of a cylindrical single-wall bubble configuration. The magnetic domains have a direction of magnetization opposite from that of the direction of the bias field and thus opposite of the magnetization of the magnetic domain propagating wafer material. An overlay of propagating pattern segments, having an arrangement described in particular detail in connection with the description of FIG. 2, is formed by a well-known soft magnetic material such as Permalloy.

Generally, the propagating pattern arrangement of the propagation device 11 includes a predetermined group of closed-end counting loops. Six exemplary loops 14, 15, 16, 17, 18 and 19 is shown in FIG. 1. It is to be understood that the number of counting loops included in a group may be varied depending upon the desired number of counts to be accumulated by the counter 10. It is an important feature of this invention that each of the closed-end counting loops includes a different number of pattern cells each corresponding to a count location within the loop as described more fully hereinbelow. The counting loops 14, 15, 16, 17, 18 and 19 include seven, eight, nine, ten, eleven and twelve count locations, respectively, formed by individual pattern cells shown in FIG. 2. The total of fifty seven loop cells in this example can store a count number in excess of one half million with a maximum count number of 665,280.

The counting loops are oriented in a parallel relationship to each other and have domain entrance and exit portions adjacent a closed-end readout loop 22. Bidirectional transfer gates 23, 24, 25, and 26, 27 and 28 are positioned at the junctions of the counting loops 14, 15, 16, 17, 18 and 19 and the readout loop 22. As noted further hereinbelow, the transfer gates include a common control pattern lead 29 responsive to a transfer pulse to direct magnetic domains either into or out of the counting loops or, when not pulsed, to circulate in either the counter loops 14 through 19 or the readout loop 22. the upper left-hand end of the readout loop 22 is connected to magnetic domain magnetoresistive detector 30. A combined magnetic domain generator and eraser 31 is positioned between the end of the detector 30 and the upper right-hand end of the readout loop 22.

The magnetic fields applied to the wafer 12 include a bias magnetic field $H_1$ which is developed by a bias field source 32. Counted and readout drive magnetic fields $H_2$ and $H_3$, respectively, are generated by a counted drive field source 33 and a readout drive field source 34. The bias field source 32 preferably includes a permanent magnet for applying a magnetic field having a proper direction of magnetization, normally perpendicular to the wafer 12, to stabilize magnetic domains in the wafer 12. The drive field sources 33 and 34 produce in-plane rotating drive magnetic fields which propagate magnetic domains within the wafer 12 and along the propagating paths defined by a pattern of propagating segments.

External circuit connections are made to the domain control elements of the wafer 12 from a control circuit 36 and from a readout decoder 38. Conductor 39 applies transfer pulses to the control pattern lead 29 of the transfer gates 23 through 28 from the control circuit 36. The conductor 40 applies nucleating and erase pulse signals from the circuit 36 to the domain generator eraser 31. A conductor 41 connects the detector 30 to the decoder 38. Clocking reference signals are applied from the control circuit 36 through the conductor 42 to the decoder 38. These clocking reference signals are related to each complete revolution of phase rotation or cycle of the readout drive field $H_3$ for decoding the count of the counter 10. The output of the decoder 38 is applied to a utilization circuit 44 through conductor 45.

The control conductors 43A, 43B and 43C are all or partly provided to connect the control circuit 36 to the field sources 32, 33 and 34, respectively. The conductor 43A is not required when the source 32 is a magnet but when a coil type of source is used the field $H_1$ can be reversed to erase all bubble domains in the wafer 12. The conductor 43B provides a decoupling or turn-off of the field $H_2$ during readout cycles of operation. The conductor 43C is capable of controlling the drive field $H_3$ for domain readout propagations in either of reverse or clockwise and counter clockwise directions in the readout loop 22.

FIG. 2 illustrates a substantially detailed view of the pattern arrangement forming the magnetic domain control elements of the wafer 12 shown in FIG. 1. It is to be understood that the conductors 39, 40 and 41 and grounded connections as shown at the wafer 12, are made to the wafer elements 29, 31 and 30, respectively, as described hereinafter Generally, magnetic domain propagating paths are formed in the counting and readout loops by a Permalloy overlay of conventional T-bar segments. A typical T-bar pattern cell is outlined by the block designated 46 in the readout loop 22. As is known, one phase rotation of an in-plane rotating drive field advances a magnetic domain in the wafer 12 and below the propagating pattern from below one T-bar pattern cell to an adjacent T-bar pattern cell. These T-bar pattern cells are included in the readout loop 22 and the counting loops 14 through 19 with minor modifications described more fully hereinbelow. Conventional chevron shaped propagating segments provide propagating paths through the detector 30 and the combined domain generator and eraser 31.

The patterns of the counting loops 17, 18 and 19 are shown in detail in FIG. 2 and phantom lines represent the counting loops 14, 15 and 16 since these counting loops are constructed in accordance with the arrangements of the loops 17, 18 and 19 except that they include different numbers of pattern cells in accordance with the operation of this invention. The ten, eleven, and twelve pattern cells of the loops 17, 18 and 19 provide the count locations 1 through 10, 1 through 11 and 1 through 12, respectively. For purposes of this description it will be assumed that a domain starts and ends its propagated travel from the inner end of a bar segment of each pattern cell with each complete drive field phase rotation. The domains travel in counterclockwise directions in the counting loops and clockwise in the readout loop. The counting loop cell positions correspond to a count location which is a binary bit position wherein the presence of a domain at a pattern cell corresponds to one binary representation and the remaining vacant cells represent an opposite binary representation.

As is well understood by those skilled in the art, parallel propagating paths at opposite sides of each of the counting loops are formed by opposite pattern cells of T-bar segments in which the ends of the T-segments are joined together so that they define an I-segment common to the oppositely disposed pattern cells. The lower and closing ends of the even count counting loops 17 and 19 each have a "double corner" pattern configuration 47A and 47B and the odd number counting loop 18 has a "single corner" pattern configuration 48 including a counting pattern cell which is the middle count location of the associated loop. For example, the pattern configuration 48 includes the six count of the eleven count loop 18. The first and end counting pattern cells of each counting loop are formed by an upper I-segment having the upper ends, which are adjacent the readout loop 22, bent inwardly so that the counting path continues between the end and first counting pattern cells. Also, the first and end counting pattern cells define domain entrance and exit portions of the counting loops at the transfer gates.

The transfer gates 26, 27 and 28 are shown in detail in FIG. 2. These transfer gates may be any of known construction for bi-directional transfer gates and the type included in the gate 26, 27 and 28 are referred to as a dollar-sign type. These transfer gates are described in the article entitled "Dollar-Sign Transfer For Magnetic Bubbles" by J. L. Smith, D. E. Kish, and P. I. Bonyhard in IEEE Transactions On Magnetics, Vol. MAG-9, No. 3, September, 1973, Pages 285–289. Generally, the transfer gates include a dollar-sign propagating segment indicated by numerals 49A, 49B and 49C in the gates 26, 27 and 28, respectively. Weaving conductor portions 50A, 50B and 50C of the control lead 29 are included in the transfer gates and overlay the dollar-sign segments to provide a path extending between the counting loops and the readout loop as indicated in FIG. 2. The transfer pulse signals pass through the weaving conductor portions 50A, 50B and 50C and similar portions of the gates 23, 24 and 25 from the control circuit 36 in proper phase relationship to the in-plane rotating drive field H to effect propagation of a magnetic domain bubble from the readout loop 22 into the first pattern cell of the counting loops. Also, the gates direct a magnetic domain from the end pattern cell of each counting loop back into the readout loop 22. When no transfer pulse signal is applied to the weaving conductor portions, domains within the counting loops 14 through 19 continue to be rotated in an endless circulating path within each counting loop by the counted drive field $H_2$. After the domains are placed in the readout loop 22 they are propagated by the readout drive field $H_3$ past the transfer gates in the absence of a transfer pulse signal.

In the readout loop 22, a predetermined number of pattern cells are included in the readout loop portions 22A, 22B, 22C, 22D, 22E, 22F extending immediately adjacent the left-hand side of the transfer gates 23, 24, 25, 26, 27 and 28, respectively. There must be at least the same number of pattern cells included in each of these readout loop portions as there are pattern cells in a counting loop connected at a transfer gate common to the associated immediately adjacent left-hand readout loop portion. For example readout loop portion 22A will have at least seven pattern cells to correspond to the seven count counting loop 14. Preferably, all of these portions of the readout loop include the same number of pattern cells as there are pattern cells in the longest or highest count counting loop. For example, in FIG. 2 there are provided twelve pattern cells in each of the readout loop portions 22A, 22B, 22C, 22D, 22E and 22F corresponding to the twelve and highest count of loop 19. This establishes identical binary readout bit frames for each loop in which each has the same twelve bit positions as described more fully hereinbelow in connection with the description of FIG. 3. The readout loop portion 22A extends to the left-hand or entrance side of the domain detector 30. A readout loop portion 22G having a predetermined number cells, for example twelve, which completes the readout loop propagating path from the right-hand or exit side of the domain generator and eraser 31 and to the transfer gate 28. For purposes of the above explanation the domains, such as D shown in the cell 46 are to be taken as propagated clockwise around the loop 22, however, they can be propogated clockwise by control of the field $H_3$ as noted above.

The domain detector 30 includes a domain expander portion having vertical rows of increasing numbers of chevron segments extending from the left-hand or entrance side to a domain sensor 52. The longest row of the chevron propogating segments and an integral conductor loop 53 form the sensor 52 as one of the magnetoresistive types. The magnetic domains are expanded to a large size as they pass under the magnetoresistive sensor 52. A sensed output pulse signal is generated due to the change in resistance in response to the magnetization of a magnetic domain being propagated under the conductor loop 53. This type of detector is well known and the detector 30 may be replaced with any of other known types of magnetic domain detectors. The vertical rows of chevron segments extend to the right of the magnetoresistive sensor 52 with decreasing numbers of the chevron propagating segments. These segments terminate at the right-hand and exit side of the detector 30.

The combined domain generator and eraser 31 includes two short vertical rows of chevron propagating segments 54A and 54B and a hairpin conductor loop 55 is deposited over the rows of chevron segements 54A and 54B. Nucleating and erase pulse signals are applied through the conductor loop 55 of the domain generator and eraser 31 so as to nucleate a magnetic domain therein. The generated domains are propogated in response to the readout drive field $H_3$ into the readout loop portion 22G. Also, a magnetic domain which is propagated into the generator eraser 31 is destroyed in response to an erase pulse signal applied to the hairpin conductor loop 55. The combined domain generator and eraser 31 is of a type described in the article "Field Nucleation of Magnetic Bubbles" by T. J. Nelson, Yu-ssu Chen, and J. E. Geusic in the IEEE Transactions On Magnetics, Vol. MAG-9, No. 3, September 1973, pages 289–293 and maybe of any other suitable type.

The operation of the magnetic counter 10 as shown in FIG. 1 is now described it being understood that the magnetic propagating paths in the readout and counting loops and that the magnetic domain detector 30 and generator and eraser 31 are provided by the elements and pattern arrangements of FIG. 2. Initially, nucleating pulse signals are applied to the combined domain generator and eraser 31. The readout drive field $H_3$ propagates magnetic domains into the readout loop 22. Transfer pulse signals are applied to the transfer gates in proper phase relative to the drive field $H_3$ and timing relationship relative to the domain positions to establish magnetic domains at the first pattern cell of each of the counting loops. This initializes the counting loops for counting with each complete revolution in phase rotation of the counted drive field $H_2$. Magnetic domains circulating in each of the loops 14, 15, 16, 17, 18 and 19 provide the maximum count capacity of the counter equal to the numbers of pattern cells in the loops multiplied together. Accordingly, in the embodiment shown in FIGS. 1 and 2 there is a maximum count of 665,280 counts. When fewer than all of the loops are provided with magnetic domains, the maximum count is reduced by a factor equal to the number of pattern cells in the counting loops which are not used. For example, if only the counting loops 18 and 19 were used there would be a maximum count of one hundred thirty-two.

Each revolution in phase rotation of the counted drive field $H_2$ simultaneously advances the magnetic domains in each of the counting loops 14 through 19. For example, after forty counted drive field phase rotations the magnetic domains of the counting loops will be at the pattern cells of count locations 5, 8, 4, 10, 7 and 4 in the loops 14, 15, 16, 17, 18 and 19, respectively. At the next single count of forty-one, the magnetic domains will be at the pattern cells of count locations 6, 1, 5, 1, 8 and 5 in the counting loops 8 through 12, respectively. And a still further example, at the count of 10,000 the magnetic domains will be at the pattern cell count locations 4, 8, 1, 10, 1 and 4 of the loops 7 through 12, respectively. Accordingly, a different combination or permutation of magnetic domain positions within an associated counting loop is provided for each number between a first count and a count of 665,280.

At a time when it is desired to readout the count accumulated by the counting loops 14 through 19, it is preferable that the counted drive field $H_2$ is stopped and the readout drive field $H_3$ is then applied to the wafer 12. This prevents displacement of the count representing orientations of the domains in the loop 22. Transfer pulse signals are simultaneously applied to all the transfer gates so that the magnet domains pass out of the counting loops and into the readout loop 22. It is important that the gates are activated for exactly twelve $2\pi$ radians of phase rotations or complete revolutions of the drive field $H_3$ to enter and exit the domains from the counting loops. Since each phase rotation of the readout drive field steps the magnetic domains through one pattern cell position, the arrangement of the readout loop portions 21A, 22B, 22C, 22D, 22E and 22F provide twelve binary bit positions in a twelve bit binary readout frame associated with each of the loops 14 through 19. If the readout portion 22A includes the twelve pattern cells defining the binary readout frame for the loop 14, the readout drive field $H_3$ will drive the magnetic domain from the loop 14, under proper control of the transfer gate 23, and the domain will be propagated through the detector 30. Assuming that there is a count of forty in the counter 10, the vacant pattern cell position 7 of loop 14 will pass first relative to the domain detector 30 and then the vacant cell position 6 followed by the magnetic domain at the counting pattern cell position and count location 5. The domains will be propagated to the left or clockwise along the readout loop 22 and through the detector 30 and back out the right hand side of the detector 30 and then through the generator and eraser 31. By activating and opening the transfer gates for twelve rotations of the field $H_3$, the domains are extracted from the counting loops and then reentered to maintain a constant encoded spaced relationship representing the counter count number and return to the loops for nondestructive readout.

Figure 3:
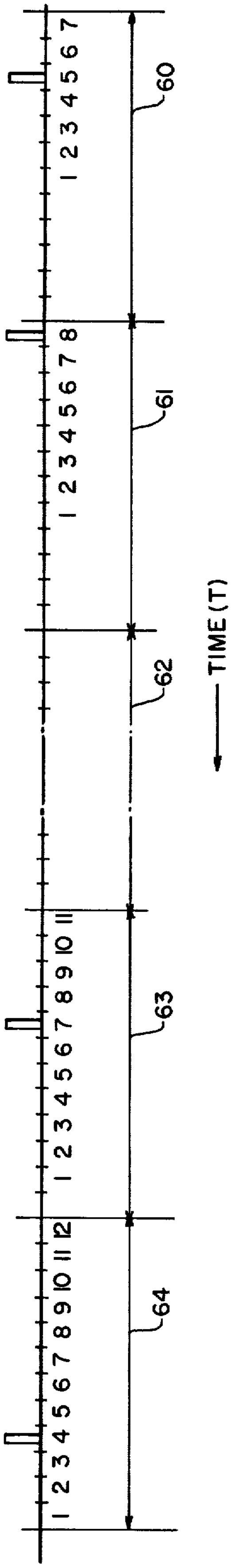
FIG. 3 is a time graph of signals generated at a domain detector in accordance with one operative condition of the magnetic domain counter illustrated in FIG. 1.

FIG. 3 shows a partial time graph of the signals produced by the detector 30 for a count of forty. The elapsed time T extends from right to left to correspond to the spaced relationship of the domains going through the detector 30. The arrow designated 60 indicates the time interval for the twelve bit positions of the binary readout frame associated with the loop 14. Correspondingly, the arrow designated 61 indicates the interval for the binary readout frame associated with the loop 15 and the dashed line portion designated 62 includes the binary readout frames associated with the loops 16 and 17 which are omitted for purposes of simplifying the graph of FIG. 3. Similarly, the arrows designated 63 and 64 represent the intervals for the binary readout frames associated with the loops 18 and 19. It is noted that for a count of forty, a detected pulse will be provided at the cell positions 5 during the interval 60, at the cell position 8 of the interval 61, at the cell position 7 of the interval 63, and at the cell position 4 of the interval 64.

The detected magnetic domain signals are applied from the detector 30 to the decoder 38 along with the clocking reference signals on conductor line 42 from the control circuit 36. A clocking reference signal will represent each phase rotation of the readout drive field $H_3$ and this corresponds to each of the bit positions of the binary readout frame intervals shown in FIG. 3. The decoder output then develops an electrical signal of a desired form representing the count number of the counter for use at the utilization circuit 44 which may include a visual numerical display device if desired.

Figure 4:
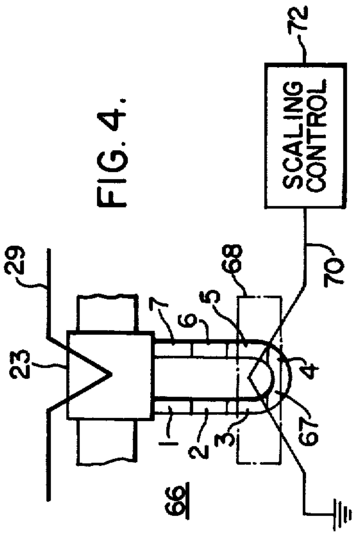
FIG. 4 is an alternative embodiment of a closed-end counting loop.

In FIG. 4 there is illustrated a schematic view of an alternate embodiment of one of the counting loops such as counting loop 14 in FIGS. 1 and 2. The alternative counting loop 66 provides either of two alternate paths either including a pattern cell 67 or bypassing the pattern cell 67 to form a counting loop of either 7 or 6 pattern cell positions and, accordingly, 7 or 6 count locations. A transfer gate 68 is provided between the pattern cell locations 3 and 5 and the pattern cell 67 in which the gate 68 is made in accordance with the transfer gates 23 to 28 as described hereinabove in connection with the description of FIG. 2. A transfer pulse may be applied to the transfer gate 68 through the conductor 70 connected to a scaling control circuit 72. By including either 6 or 7 counts in the counting loop 66 the scale factor of the counter may be adjusted and the number of counts and counting function desired may be altered by having either of 6 or 7 count locations in the loop 66. Various combination of counting loops such as the loop 66 may be connected to the readout loop 22 to provide increased flexibility in the operation of the magnetic domain counter 10.

Figure 5:
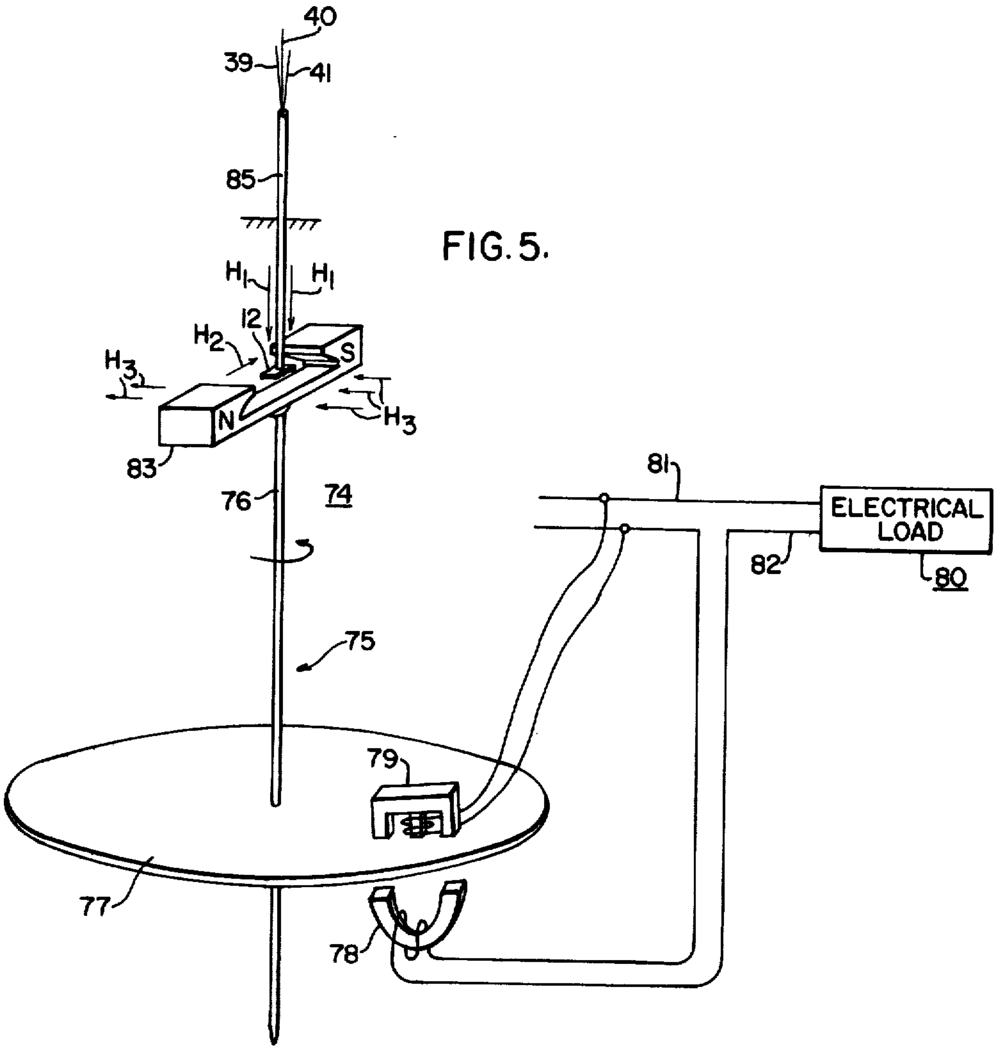
FIG. 5 is a schematic illustration of a meter controlled domain drive magnetic field source including a rotatable watthour meter movement for the counter shown in FIG. 1.

Referring now to FIG. 5 there is shown a meter controlled drive magnetic field source 74 including a meter movement 75 which is rotated in response to a quantity such as a fluid flow or electromagnetic forces such as provided in a meter movement of a watthour meter. An important part of the meter movement 75 is the shaft 76 including a shaft driving member which is provided in FIG. 5 by an electroconductive disk 77 driven in response to the magnetic fields of a current electromagnet structure 78 and a voltage electromagnet structure 79. The electromagnetic structures 78 and 79 are conventional parts of an induction watthour meter for measuring the flow of electrical power and the electrical energy being consumed by an electrical load 80 connected to the electrical conductors 81 and 82. A permanent magnet 83 is mounted for rotation by the shaft 76. The center magnet portion is recessed to define opposingly spaced north and south magnetic poles, as shown. The wafer 12 of the propagation device 11 is suitably supported, for example on the end of a stationary hollow tube to be equally spaced between the north and south poles of the permanent magnet 83. Leads including conductors 39, 40 and 41 are connected to the elements of wafer 12 and to the associated control circuit 36 and decoder 38 as described hereinabove in connection with FIG. 1. The conductor leads would extend through the center of the wafer supporting tube 85. Accordingly, as the shaft 76 is rotated at a rate proportional to the electric power flowing in the conductors 81 and 82, the permanent magnet field rotates in the plane of the wafer 12 to develop the counted drive magnetic field $H_2$ so that one count is accumulated in the counting loops for each 360° of mechanical rotation of the shaft 76. A readout drive magnetic field $H_3$ may be provided by a conventional means such as four stationary orthogonal spaced pairs of coils, not shown, orienting the drive field $H_3$ in the plane of the wafer 12. The coils can be connected together and to the conductors 81 and 82 to receive 60 Hz power line input signals to sequentially develop 90° time displaced rotating readout drive magnetic fluxes. Preferably, the counted drive field $H_2$ provided by the permanent magnet 83 would be disabled such as by a clutch means, not shown, controlled from conductor 43B of the control circuit 36 in FIG. 1 to stop the rotation of the permanent magnet 83 with rotation of the shaft 74. If the permanent magnet is not stopped the readout cycle for readout of the magnetic domains to the detector 30 and decoder 38 is a very short time interval so that the loss of counts due to the meter movement rotation would result in a negligible loss of the measured electrical power flow. More importantly, the counted drive field $H_2$ should be stopped during the readout cycle of operation to prevent reorientation of the magnetic domains. In accordance with the description of FIG. 1 and 2 the magnetic domains may be turned to their original positions existing prior to the read cycle and continue to count and accumulate a total count not dependent upon the time of occurrence of a read cycle. This nondestructive readout is an important feature of this invention.

It is to be noted that the meter controlled permanent magnet drive field source 74 shown in FIG. 5 is particularly advantageous since in the event of a loss of power, for example, an interruption in the power flow of the conductors 81 and 82 the magnetic domain remain in their last counting position within the counting loops and therefore provide a non-volatile memory of the counts. Since the bias magnetic field $H_1$ and counted magnetic field $H_2$ are permanent magnets, no external power is needed to accumulate the count of shaft rotations. The non-destructive readout as described above, provides a further feature and the arrangement of FIG. 5 provides a meter responsive counter utilizing a negligible amount of power consumption for measuring operation.

Figure 6:
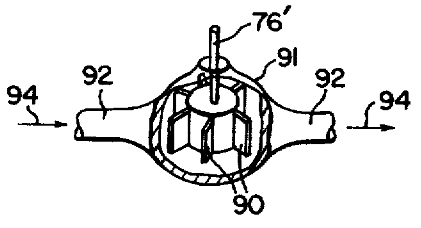
FIG. 6 is a schematic illustration of an alternative embodiment of an impeller shaft drive for the drive field source shown in FIG. 5.

FIG. 6 illustrates a fragmentary perspective view of an alternative shaft driving member for rotating the shaft 76 shown in FIG. 5. An impeller 90 is mounted in a housing 91 coupled to a fluid conducting pipe 92 such as used to conduct water or natural gas at a residential dwelling. Fluid flow is indicated by arrows 94 to drive the shaft 76. The shaft rotations are counted in the wafer 12 and the counts are scaled to the volume rate of the fluid flow. Use of permanent magnets for the sources of the magnetic fields $H_1$ and $H_2$ enables the fluid flow to be measured without requiring a source of electrical power.

The invention as described hereinabove is capable of several alternatives and modifications which are apparent to those skilled in the art without departing from the spirit and scope of our invention.

We claim:

1. A magnetic domain counter comprising:

a wafer of magnetic domain propagating material; a closed-end readout loop in said wafer formed by a predetermined number of serially formed pattern cells, means for producing a readout drive magnetic field rotating in the plane of said wafer to propagate magnetic domains in said readout loop; a magnetic domain detector coupled to said readout loop for generating a signal in response to the presence of a magnetic domain; a magnetic domain generator coupled to said readout loop for establishing any desired number of magnetic domains in said readout loop; a plurality of closed-end counting loops formed in said wafer by a predetermined number of propagating pattern cells with each of said counting loops including a different number of pattern cells relative to the other counting loops, each pattern cell of a loop defining a separate count location of the loop, and each of said counting loops being coupled to said readout loop at predetermined pattern cell positions of said readout loop so as to form domain entrance and exit junctions; a plurality of magnetic domain transfer gates, each of said transfer gates being formed on said wafer adjacent a different one of said junctions between said readout loop and said counting loop, said transfer gate being responsive to a transfer control signal to direct magnetic domains into and out of each of said counting loops at first and end counting pattern cell positions, respectively; and means for producing a counted drive magnetic field rotating in the plane of said wafer to simultaneously propagating magnetic domains in each of said counting loops such that the positions of said magnetic domains in said counting loops are representative of a corresponding number of revolutions of said counted drive field and whereby the maximum count of said magnetic domain counter is equal to the product of the sums of the pattern cells in said counting loops having a magnetic domain propagated therein by said counted drive magnetic field.

2. The magnetic domain counter as claimed in claim 1 wherein portions of the readout loop formed adjacent each of the transfer gates includes at least a number of pattern cells equal to the pattern cells in the counting loop associated with the adjacent transfer gate.

3. The magnetic domain counter as claimed in claim 2 wherein each of said portions of the readout loop include the identical number of pattern cells and wherein said identical number is equal to the number of pattern cells in a counting loop having the maximum counting locations relative to the other counting loops.

4. The magnetic domain counter as claimed in claim 1 wherein at least one of the counting loops includes an additional magnetic domain transfer gate formed on said wafer to direct a magnet domain of the one counting loop past one of the pattern cells therein in response to a further transfer control signal, whereby the number of count locations of the one counting loop is variable.

5. The magnetic domain counter as claimed in claim 1 including control circuit means effective to selectively control the readout drive field and the counted drive filed so that the fields are applied separately at different times, said control circuit means further effective to supply a transfer control signal to the transfer gated during a predetermined number of complete revolutions of the readout drive field; said magnetic domain counter further including decoder means responsive to the signal of said magnetic domain detector and being further responsive to clocking reference signals representing each revolution of the readout drive field such that said decoder means produces an output representative of the count number of said magnetic domain counter upon the magnetic domains of the counting loops being propagated past the magnetic domain detector by the readout drive field.

6. The magnetic domain counter as claimed in claim 1 including a permanent magnet having opposite magnetic poles aligned in the plane of the wafer and being rotatable to provide the counted drive magnetic field.

7. The magnetic domain counter as claimed in claim 6 including a rotating member supporting the permanent magnet; and further including a meter movement rotatably driving said rotating member in response to the rate of flow of a quantity to be measured whereby the count of said magnetic domain counter is representative to the consumption of said quantity to be measured.

8. The magnetic domain counter as claimed in claim 7 wherein said meter movement is an induction watthour meter type including a rotating electroconductive disk magnetically driven in response to a voltage electromagnet structure and a current electromagnet structure connected to a flow of electrical power so that the quantity to be measured is electrical energy.

9. The magnetic domain counter as claimed in claim 6 including an impeller coupled to the permanent magnet, said impeller being operative for driven rotation in response to the flow of fluid quantity.

* * * * *